US008810224B2

(12) United States Patent
Zhang et al.

(10) Patent No.: US 8,810,224 B2
(45) Date of Patent: Aug. 19, 2014

(54) SYSTEM AND METHOD TO REGULATE VOLTAGE

(75) Inventors: Junmou Zhang, San Diego, CA (US); Yuan-Cheng Pan, San Diego, CA (US); Mikhail Popovich, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 13/278,294

(22) Filed: Oct. 21, 2011

(65) Prior Publication Data

US 2013/0099764 A1 Apr. 25, 2013

(51) Int. Cl.
*G05F 1/00* (2006.01)
*H02H 7/00* (2006.01)
*H02H 9/00* (2006.01)

(52) U.S. Cl.
USPC .............................. 323/284; 323/280; 361/18

(58) Field of Classification Search
USPC .......... 314/135; 323/274, 276, 280, 282, 284; 361/18
See application file for complete search history.

(56) References Cited

U.S. PATENT DOCUMENTS 6,246,221 B1 6/2001 Xi
6,300,749 B1 10/2001 Castelli et al.
6,765,374 B1 7/2004 Yang et al.
7,173,402 B2 * 2/2007 Chen et al. .................... 323/280
7,218,082 B2 5/2007 Walter et al.
7,675,273 B2 * 3/2010 Ko et al. ....................... 323/269
7,843,180 B1 11/2010 Cilingiroglu
2005/0010887 A1 * 1/2005 Bednar et al. ..................... 716/8
2008/0157735 A1 * 7/2008 Liu et al. ....................... 323/280
2009/0115382 A1 5/2009 Hasegawa et al.
2010/0109624 A1 * 5/2010 Lourens et al. ............... 323/280
2010/0156362 A1 * 6/2010 Xie .............................. 323/273
2010/0195414 A1 * 8/2010 Kim et al. ................ 365/189.07
2012/0057400 A1 * 3/2012 Kim et al. ..................... 365/158
2013/0028010 A1 * 1/2013 Li et al. ......................... 365/158
2013/0033329 A1 * 2/2013 Zhu et al. ........................ 331/15
2013/0077635 A1 * 3/2013 Deivasigamani et al. .... 370/402

FOREIGN PATENT DOCUMENTS

CN 101419479 A 4/2009
EP 1806640 A2 7/2007

OTHER PUBLICATIONS

International Search Report and Written Opinion—PCT/US2012/061363—ISA/EPO—Apr. 9, 2013.
Partial International Search Report and Written Opinion—PCT/US2012/061363—ISA/EPO—Feb. 1, 2013.

* cited by examiner

*Primary Examiner* — Adolf Berhane
*Assistant Examiner* — Gary Nash
(74) *Attorney, Agent, or Firm* — Sam Talpalatsky; Nicholas J. Pauley; Joseph Agusta

(57) ABSTRACT

A system and method to regulate voltage is disclosed. In a particular embodiment, a voltage regulator includes an error amplifier, a voltage buffer responsive to the error amplifier, and a first transistor responsive to the voltage buffer and coupled to a voltage supply source. A second transistor is coupled to the voltage supply source and further coupled to an output node. A third transistor is coupled to the first transistor and has a gate coupled to a capacitor. The capacitor is coupled to a node between the error amplifier and the voltage buffer.

41 Claims, 5 Drawing Sheets

SYSTEM AND METHOD TO REGULATE VOLTAGE

I. FIELD

The present disclosure is generally related to a system and method of regulating voltage.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Such computing devices often use steady voltage supplies provided by voltage regulators, such as low drop-out (LDO) regulators. LDO regulators are particularly suited for use in portable electronic devices due to their small size and interoperability. LDO regulators balance stability considerations with power supply and space constraints and may be used to provide a constant output voltage.

III. SUMMARY

In a particular embodiment, a voltage regulator enables frequency compensation to maintain a constant voltage level using a low input power. The frequency response of the voltage regulator may be stabilized by adjusting capacitance and transistor transconductance values to cause a zero to substantially track variations in an output pole.

In another particular embodiment, a voltage regulator includes an error amplifier, a voltage buffer responsive to the error amplifier, and a first transistor responsive to the voltage buffer and coupled to a voltage supply source. A second transistor is coupled to the voltage supply source and is further coupled to an output node. A third transistor is coupled to the first transistor and has a gate coupled to a capacitor. The capacitor is coupled to a node between the error amplifier and the voltage buffer.

In a particular embodiment, a method of regulating voltages includes receiving an unregulated voltage at a first transistor and at a second transistor. A third transistor is biased based on a bias current from the first transistor. The first transistor and the second transistor are responsive to an error voltage generated by an error amplifier that is responsive to a reference voltage and to an output node of a voltage regulator via a feedback path.

In another particular embodiment, an apparatus includes a semiconductor device that includes a first voltage island and a second voltage island. A first voltage regulator on the first voltage island is configured to power the first voltage island. A second voltage regulator on the second voltage island is configured to power the second voltage island. The first voltage regulator and the second voltage regulator each include a first transistor, a second transistor, a third transistor, and a capacitor. The capacitor has a value of less than 300 picofarads (pF).

One particular advantage provided by at least one of the disclosed embodiments includes enabling voltage regulation with a low power supply. Embodiments may also include small capacitor sizes and frequency stability compensation.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

A voltage regulator may be used to automatically maintain a constant voltage level, such as to provide a steady voltage supply to portable electronic devices. The voltage regulator may operate by comparing an output voltage to a reference voltage. A detected difference may be amplified and used to reduce voltage error. A particular embodiment may adjust a frequency response by causing a zero in an open loop gain to change position according to an output pole associated with the output voltage. The zero may offset the output pole to stabilize the voltage regulator.

Figure 1:
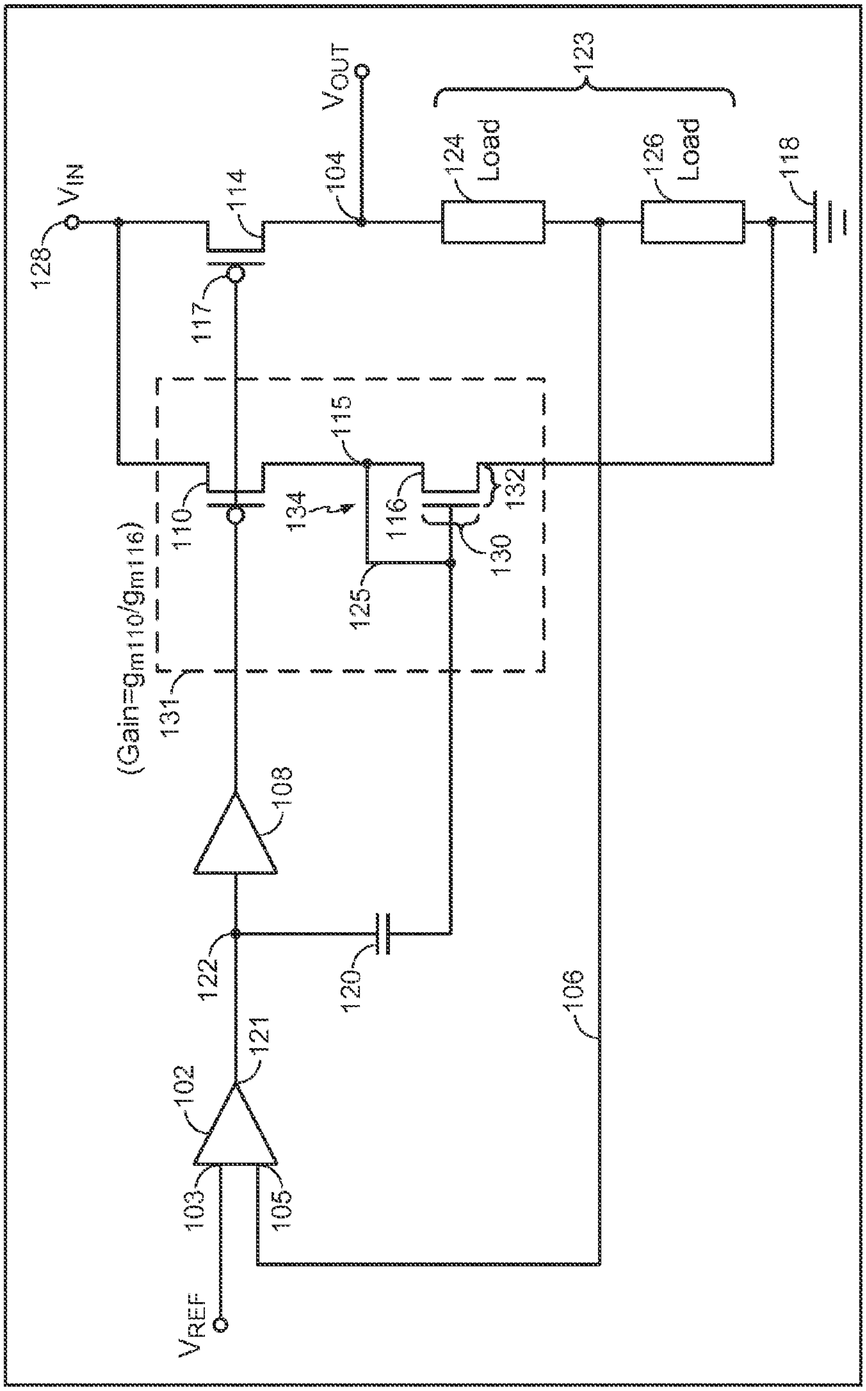
FIG. 1 is a diagram of a particular illustrative embodiment of a voltage regulator.

Referring to FIG. 1, a particular illustrative embodiment of a voltage regulator is disclosed and generally designated 100. According to a particular embodiment, the voltage regulator 100 is a low drop-out (LDO) regulator. The voltage regulator 100 may include an error amplifier 102 configured to receive an input voltage, or a reference voltage $V_{REF}$, at a first input 103. A second input 105 of the error amplifier 102 may be coupled to an output node 104 via a feedback path 106. The output node 104 may be associated with an output voltage $V_{OUT}$. The error amplifier 102 may be coupled to a voltage buffer 108. A gate of a first transistor 110 may be coupled to an output of the voltage buffer 108, and a drain of the first transistor 110 may be coupled to a drain 115 of a third transistor 116. The first transistor 110 may further be coupled to a gate 117 of a second transistor 114. A drain of the second transistor 114 may be coupled to a load 123, and a source of the second transistor 114 may be coupled to a voltage supply source $V_{IN}$. A gate of the third transistor 116 may be coupled to a capacitor 120. The capacitor 120 may be coupled to the output of the error amplifier 102 at a node 122 located between the error amplifier 102 and the voltage buffer 108.

A frequency within the voltage regulator 100 may be stabilized by manipulating capacitance and transistor transconductance values. The manipulated values may cause a zero to substantially track variations in an output pole towards stabilizing the voltage regulator 100 and maintaining a constant voltage. The output pole may be associated with an output node 104 of the voltage regulator 100. A pole may generally define a frequency that makes a gain of a filter transfer function infinite (e.g., a denominator of the transfer function equals zero). The zero may be associated with a circuit arrangement that includes a gain of the first transistor 110 and the third transistor 116 combined with a capacitance of the capacitor 120. A zero may generally define a frequency that makes a gain of a filter transfer function zero (e.g., a numerator of the transfer function equals zero). The gain of the first transistor 110 and the third transistor 116 and the capacitance may create a Miller effect to increase an effective capacitance. The effective capacitance may facilitate both a smaller capacitor size of the capacitor 120 and a smaller voltage supply.

The error amplifier 102 may be configured to generate an error voltage 121. The error amplifier 102 may be responsive to the feedback path 106 that is coupled to the output node 104 and that includes at least a portion of the load 123. For example, a signal associated with an output current from the output node 104 may be provided to the second input 105 of the error amplifier 102 via the feedback path 106.

The voltage buffer 108 may be responsive to the error amplifier 102. For example, the voltage buffer 108 may generate a buffered output in response to receiving the error voltage 121 from the error amplifier 102.

The first transistor 110 may be responsive to the output of the voltage buffer 108 and therefore to the error voltage 121 generated by the error amplifier 102. The source of the first transistor 110 may receive an unregulated voltage from the voltage supply source $V_{IN}$ 128. According to a particular embodiment, the voltage regulator 100 may be configured to operate when the voltage supply source $V_{IN}$ 128 is less than one volt, as well as at higher voltage levels.

According to a particular embodiment, the first transistor 110 may be configured to mirror the second transistor 114. Hence, a current output of the first transistor 110 may vary according to a current output of the second transistor 114. The first transistor 110 may be configured to generate a bias current 134 that is provided to the drain 115 of the third transistor 116.

The source of the second transistor 114 may receive the unregulated voltage from the voltage supply source $V_{IN}$ 128. The drain of the second transistor 114 may be coupled to the output node 104. The second transistor 114 may be a power transistor that is responsive to the error voltage 121 generated by the error amplifier 102 via the voltage buffer 108. According to a particular embodiment, the second transistor 114 may be a thin-oxide transistor to conserve space. The second transistor 114 may be smaller than the first transistor 110 and the third transistor 116.

The drain of the second transistor 114 may be coupled to the load 123 (the load 123 comprising one or more load devices 124, 126) via the output node 104. According to a particular embodiment, the load 123 is resistor divider, and the first load device 124 has twice the resistance of the second load device 126. Other embodiments may stabilize frequency under other load conditions.

The drain 115 of the third transistor 116 may be coupled to a drain of the first transistor 110 to receive the bias current 134. The source of the third transistor 116 may also be coupled to a gate of the third transistor 116 via a connection 125. The third transistor 116 may be configured to form a diode configuration directing current flow from the gate of the third transistor 116 to the capacitor 120. The first transistor 110 and the third transistor 116 may form a gain stage 131. The gain stage 131 may include a gain based on a transconductance ($g_m$) of the first transistor 110 divided by the transconductance of the third transistor 116 (Gain=$g_{m110}/g_{m116}$). According to a particular embodiment, the third transistor 116 may have a large length 130 and a small width 132 (where the length 130 and the width 132 correspond to channel dimensions). The third transistor 116 may be coupled to a ground node 118.

A loop gain of the voltage regulator 100 may include a product of a gain and a feedback factor of a feedback loop that includes the error amplifier 102, the output node 104, the feedback path 106, the voltage buffer 108, the first transistor 110, the second transistor 114, and the load 123. The loop gain may further include the output pole associated with the output node 104. The loop gain of the voltage regulator 100 may also include the zero associated with the capacitor 120 and the gain stage 131. In response to a change in the output current at the output node 104, a frequency value associated with the zero may change (e.g., in response to a larger output current). The zero may be adjusted to track or substantially track the output pole associated with the output node 104 to stabilize the voltage regulator 100.

According to a particular embodiment, the capacitor 120 may be a compensation capacitor used in combination with the third transistor 116 to adjust the zero. The zero may be adjusted to offset the output pole associated with the output node 104. The capacitor 120 may be coupled to the node 122 that is located between the error amplifier 102 and the voltage buffer 108. The gain stage 131 and the capacitor 120 may form a Miller capacitor. The Miller capacitor may increase an equivalent capacitance at the output of the error amplifier 102 and proximate to the node 122. The equivalent capacitance may equal the gain multiplied by the capacitance of the capacitor 120. The associated Miller effect may enable a large capacitance despite using a small capacitor. For example, the capacitor 120 may have a value of less than 300 picofarads (pF).

The Miller effect may further create a dominant pole, or lowest frequency pole, near the node 122. The dominant pole may be equal to the inverse of the product of the equivalent capacitance multiplied by an output resistance present at the output node 104. The dominant pole may at least partially cancel out a high frequency pole located near the output of the voltage buffer 108.

The Miller effect provided by the gain stage 131 and the capacitor 120 may further create the zero near the node 122. The zero may equal the inverse of the product of the capacitance of the capacitor 120 and a resistance of the third transistor 116. Put another way, the zero may equal the gain of the third transistor 116 divided by the capacitance of the capacitor 120. In so doing, the zero may track the remaining output pole to stabilize the voltage regulator 100.

The third transistor 116 may receive the bias current 134 from the first transistor 110. An increase in the bias current 134 may increase transconductance associated with the third transistor 116. Conversely, a decrease in the bias current 134 may decrease the transconductance associated with the third transistor 116. When a current load at the output node 104 causes the output pole to change positions, the transconductance associated with the third transistor 116 may be adjusted in response. For example, if a large current load at the output node 104 causes the output pole to change positions, the transconductance associated with the third transistor 116 may decrease. The decrease in the transconductance may cause a zero in the loop gain of the voltage regulator 100 to change position similarly and according to the output pole. The zero may offset the output pole to stabilize the voltage regulator 100.

FIG. 1 thus shows a voltage regulator 100 configured to maintain a constant voltage level using a low input power supply of less than one volt. The gain stage 131 and the capacitor 120 may create a Miller effect to increase an equivalent capacitance without using a large capacitor. The frequency of the voltage regulator may be stabilized by adjusting capacitance and transistor transconductance values to cause the zero to substantially track variations in the output pole.

Figure 2:
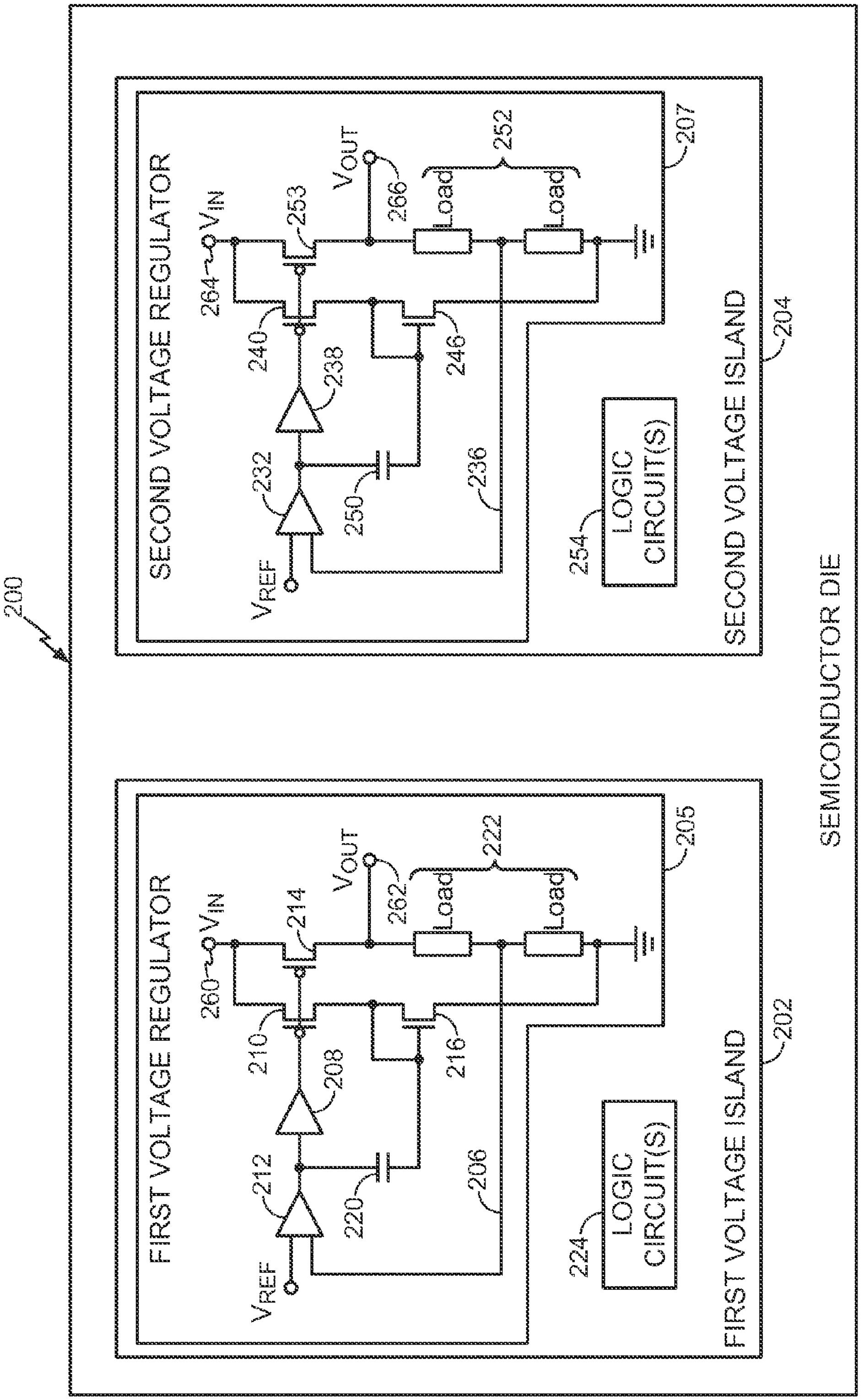
FIG. 2 is a diagram of an embodiment of a semiconductor die that includes multiple voltage islands that are each powered by their own voltage regulator.

FIG. 2 shows an embodiment of a semiconductor die 200 that includes a first voltage island 202 and a second voltage island 204. Each of the voltage islands 202, 204 may be powered by its own voltage regulator 205, 207. More particularly, the first voltage island 202 may be powered by a first voltage regulator 205, and the second voltage island 204 may be powered by a second voltage regulator 207. The first voltage island 202 and the second voltage island 204 may each include one or more logic circuits 224, 254. As such, the first voltage regulator 205 may be integrated with the logic circuit 224 in the semiconductor die 200, and the second voltage regulator 207 may be integrated with the logic circuit 254. According to a particular embodiment, the illustrative logic circuit 224 integrated with the first voltage regulator 205 may include a baseband chip.

The first voltage regulator 205 may be the same as the voltage regulator 100 of FIG. 1. As such, the first voltage regulator 205 may include an error amplifier 212 configured to generate an error voltage. A reference voltage $V_{REF}$ may be applied to a first input of the error amplifier 212. A second input of the error amplifier 212 may receive a signal from a feedback path 206 coupled to an output voltage $V_{OUT}$ 262 via at least a portion of a load 222. The error amplifier 212 may be coupled to a voltage buffer 208 that receives an error voltage from the error amplifier 212.

A first transistor 210 may be coupled to an output of the voltage buffer 208. The first transistor 210 may be coupled to a voltage supply source $V_{IN}$ 260 and to a second transistor 214. The first transistor 210 may be configured to mirror the second transistor 214. The second transistor 214 may be coupled to the voltage supply source $V_{IN}$ 260, the output voltage $V_{OUT}$ 262, and the load 222.

A third transistor 216 may be coupled to a drain of the first transistor 210 and may be coupled to have a diode configuration. The first transistor 210 and the third transistor 216 may form a gain stage. A gate of the third transistor 216 may be coupled to a capacitor 220. According to a particular embodiment, the capacitor 220 may have a value of less than 300 pF. The third transistor 216 and the capacitor 220 may affect a zero that may be adjusted to track an output pole associated with the output voltage $V_{OUT}$ 262 to stabilize the first voltage regulator 205.

The second voltage regulator 207 may be the same as the first voltage regulator 205 and the voltage regulator 100 of FIG. 1. The second voltage regulator 207 may include an error amplifier 232 configured to generate an error voltage. A reference voltage $V_{REF}$ may be applied to a first input of the error amplifier 232. A second input of the error amplifier 232 may receive a signal from a feedback path 236 coupled to an output voltage $V_{OUT}$ 266 via at least a portion of a load 252. The error amplifier 232 may be coupled to a voltage buffer 238 that receives an error voltage from the error amplifier 232.

A first transistor 240 may be coupled to an output of the voltage buffer 238. The first transistor 240 may be coupled to a voltage supply source $V_{IN}$ 264 and to a second transistor 253. The first transistor 240 may be configured to mirror the second transistor 253. The second transistor 253 may be coupled to the voltage supply source $V_{IN}$ 264, the output voltage \lour 266, and the load 252. In a particular embodiment, the $V_{IN}$ 260 may be the same as the $V_{IN}$ 264, and the $V_{OUT}$ 262 may be the same as the $V_{OUT}$ 266. In another particular embodiment, the $V_{IN}$ 260 may be different than the $V_{IN}$ 264, the $V_{OUT}$ 262 may be different than the $V_{OUT}$ 266, or any combination thereof.

A third transistor 246 may be coupled to a drain of the first transistor 240 and may be coupled to have a diode configuration. The first transistor 240 and the third transistor 246 may form a gain stage. A gate of the third transistor 246 may be coupled to a capacitor 250. According to a particular embodiment, the capacitor 250 may have a value of less than 300 pF. The third transistor 246 and the capacitor 250 may affect a zero that may be adjusted to track an output pole associated with the output voltage $V_{OUT}$ 266 to stabilize the second voltage regulator 207.

FIG. 2 thus shows a semiconductor die 200 having a plurality of voltage islands 202, 204. Each voltage island 202, 204 may include a respective voltage regulator 205, 207. Each voltage regulator 205, 207 may include a first transistor 210, 240, a second transistor 214, 253, a third transistor 216, 246, and a capacitor 220, 250. Each capacitor 220, 250 may have a value of less than 300 pF.

Figure 3:
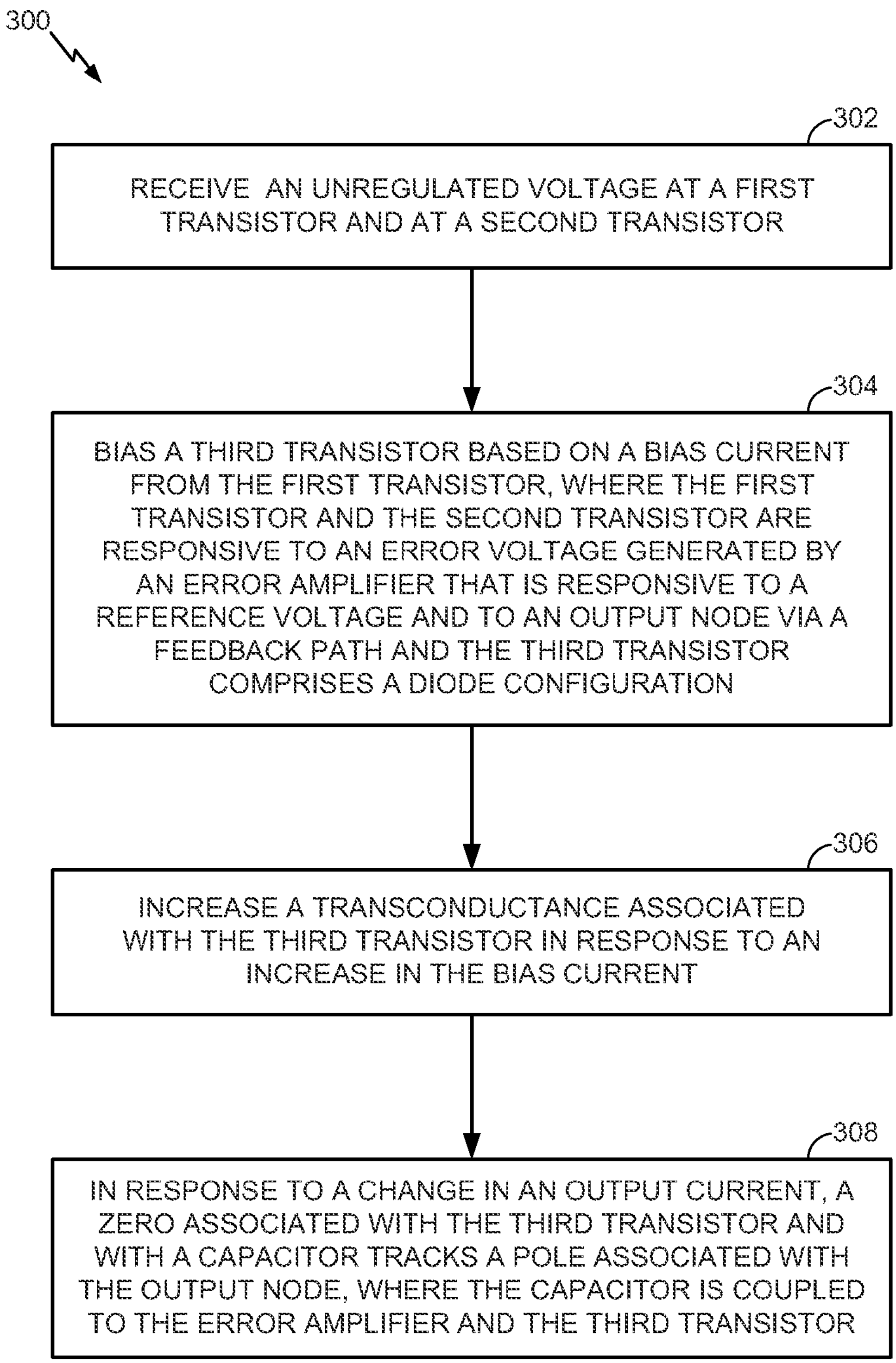
FIG. 3 is a flow diagram of an embodiment of a method of regulating a voltage by stabilizing a frequency in a voltage regulator.

FIG. 3 is a flow diagram of an embodiment of a method 300 of regulating a voltage by stabilizing a frequency in a voltage regulator. Embodiments of the method 300 may be executed or performed by the voltage regulator 100 of FIG. 1 and the voltage regulators 205, 207 of FIG. 2. The method 300 may be used by a circuit that has a zero that tracks an output pole to stabilize a voltage regulator.

At 302, an unregulated voltage may be received at a first transistor and at a second transistor. In a particular embodiment, the second transistor is a thin-oxide transistor. For example, the unregulated voltage from the voltage supply source $V_{IN}$ 128 of FIG. 1 may be received at the first transistor 110 and at the second transistor 114. The second transistor 114 may be a thin-oxide transistor to conserve space. The unregulated voltage of a particular embodiment may be under one volt.

A third transistor may be biased based on a bias current from the first transistor, at 304. The first transistor and the second transistor are responsive to an error voltage generated by an error amplifier that is responsive to a reference voltage and to an output node of a voltage regulator via a feedback path. The third transistor may comprise a diode configuration. For instance, the third transistor 116 of FIG. 1 may be biased based on the bias current 134 from the first transistor 110. The first transistor 110 and the second transistor 114 may be responsive to the error voltage 121 generated by the error amplifier 102. The error amplifier 102 may be responsive to the reference voltage $V_{REF}$ and to the output node 104 via the feedback path 106, and the third transistor 116 may include a diode configuration.

A transconductance associated with the third transistor may be increased in response to an increase in the bias current, at 306. For example, the transconductance associated with the third transistor 116 of FIG. 1 may be increased in response to an increase in the bias current 134 from the first transistor 110.

In response to a change in an output current, a zero associated with the third transistor and with a capacitor may track an output pole associated with the output node, at 308. The capacitor may be coupled to the error amplifier and the third transistor. For instance, a zero associated with the third transistor 116 and the capacitor 120 of FIG. 1 may track an output pole associated with the output node 104 of the voltage regulator 100 in response to a change in the output current. A frequency value associated with the zero may change in response to a larger output current. The capacitor 120 may be coupled to the error amplifier 102 and to the third transistor 116.

FIG. 3 thus shows an embodiment of a method 300 of stabilizing the frequency of a voltage regulator by use of a zero to track an output pole. The zero may be associated with a third transistor and capacitor. The capacitor may be coupled to an error amplifier and to the third transistor. The capacitor and third transistor arrangement may allow voltage regulation in the presence of a small capacitor and a low voltage supply.

Figure 4:
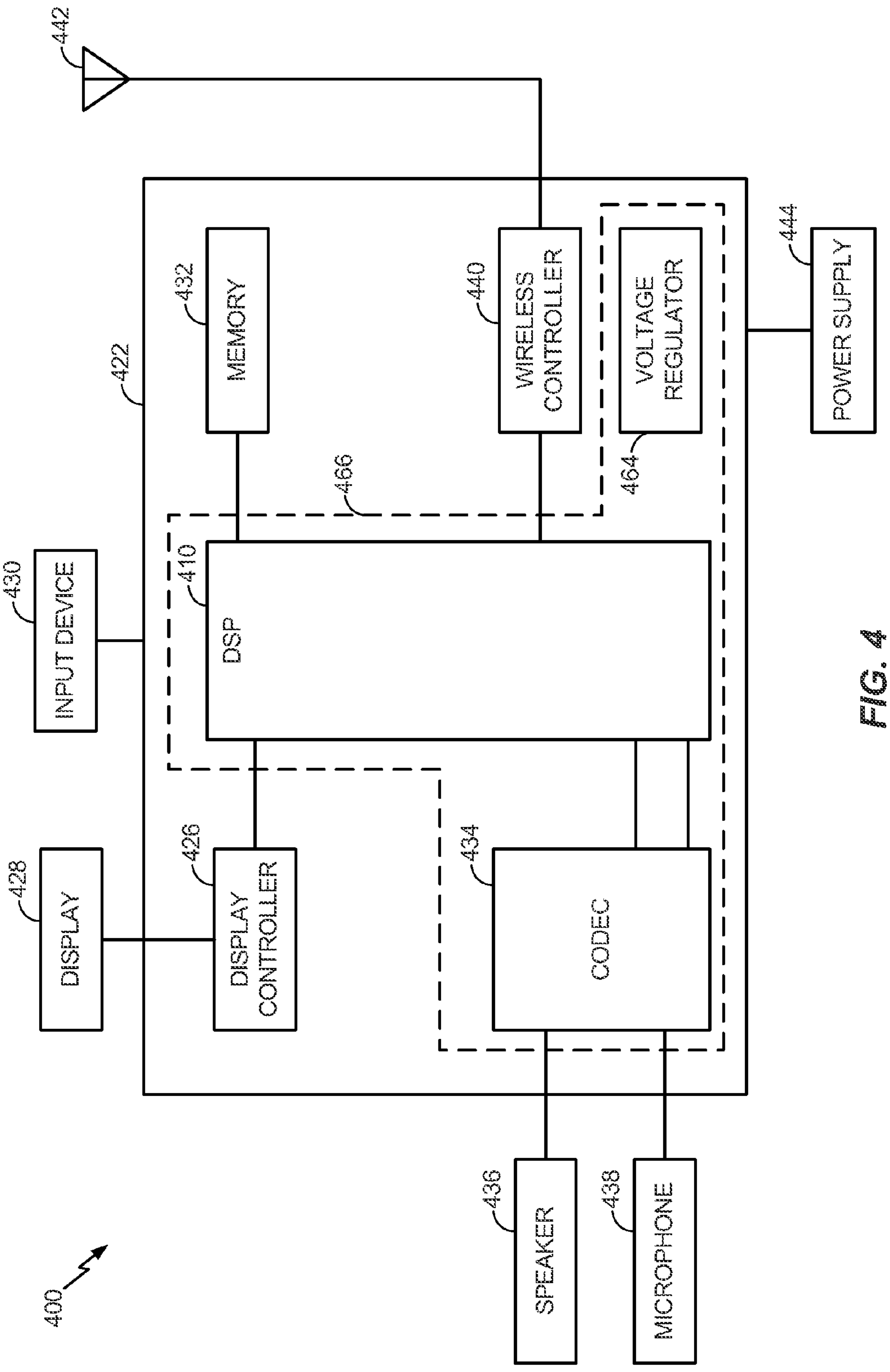
FIG. 4 is a block diagram of a portable electronic device including a system to compensate frequency in a voltage regulator.

Referring to FIG. 4, a block diagram of a particular illustrative embodiment of an electronic device including a system to regulate a voltage, is depicted and generally designated 400. The device 400 includes a processor, such as a digital signal processor (DSP) 410, coupled to a memory 432. FIG. 4 also shows a display controller 426 that is coupled to the digital signal processor 410 and to a display 428. A coder/decoder (CODEC) 434 can also be coupled to the digital signal processor 410. A speaker 436 and a microphone 438 can be coupled to the CODEC 434. The DSP 410 and the CODEC 434 may be included within a power domain 466 that is regulated by a voltage regulator 464, as described in FIGS. 1-3. According to a particular embodiment, the voltage regulator 464 may regulate a voltage received from a power supply 444 and may provide the regulated voltage to at least one of the DSP 410 and the CODEC 434.

FIG. 4 also indicates that a wireless controller 440 can be coupled to the digital signal processor 410 and to a wireless antenna 442. In a particular embodiment, the DSP 410, the voltage regulator 464, the display controller 426, the memory 432, the CODEC 434, and the wireless controller 440 are included in a system-in-package or system-on-chip device 422. In a particular embodiment, an input device 430 and the power supply 444 are coupled to the system-on-chip device 422. Moreover, in a particular embodiment, as illustrated in FIG. 4, the display 428, the input device 430, the speaker 436, the microphone 438, the wireless antenna 442, and the power supply 444 are external to the system-on-chip device 422. However, each of the display 428, the input device 430, the speaker 436, the microphone 438, the wireless antenna 442, and the power supply 444 can be coupled to a component of the system-on-chip device 422, such as an interface or a controller.

In conjunction with the described embodiments, an apparatus is disclosed that includes a means for amplifying an error, such as the error amplifier 102 of FIG. 1, the error amplifiers 212, 232 of FIG. 2, or any combination thereof. The apparatus may also include a means for buffering an output of the means for amplifying, such as the voltage buffer 108 of FIG. 1, the voltage buffers 208, 238 of FIG. 2, or any combination thereof. The apparatus may include a means for providing a bias current in response to an output of the means for buffering, such as the first transistor 110 of FIG. 1, the first transistors 210, 240 of FIG. 2, or any combination thereof. The apparatus may also include a means for feeding back the output current to the means for amplifying, such as the feedback path 106 of FIG. 1, the feedback paths 206, 236 of FIG. 2, or any combination thereof. The apparatus may further include a means for providing an output current associated with a position of a pole, such as the second transistor 114 of FIG. 1, the second transistors 214, 253 of FIG. 2, or any combination thereof. The apparatus may also include a means for adjusting a zero to track the position of the pole to stabilize the means for providing the output current, such as the gain stage 131 and the capacitor 120 of FIG. 1.

In conjunction with the described embodiments, method of regulating voltage is disclosed that includes a step for receiving an unregulated voltage at a first transistor and at a second transistor and a step for biasing a third transistor based on a bias current from the first transistor. The first transistor and the second transistor may be responsive to an error voltage generated by an error amplifier that is responsive to a reference voltage and to an output node of a voltage regulator via a feedback path.

Figure 5:
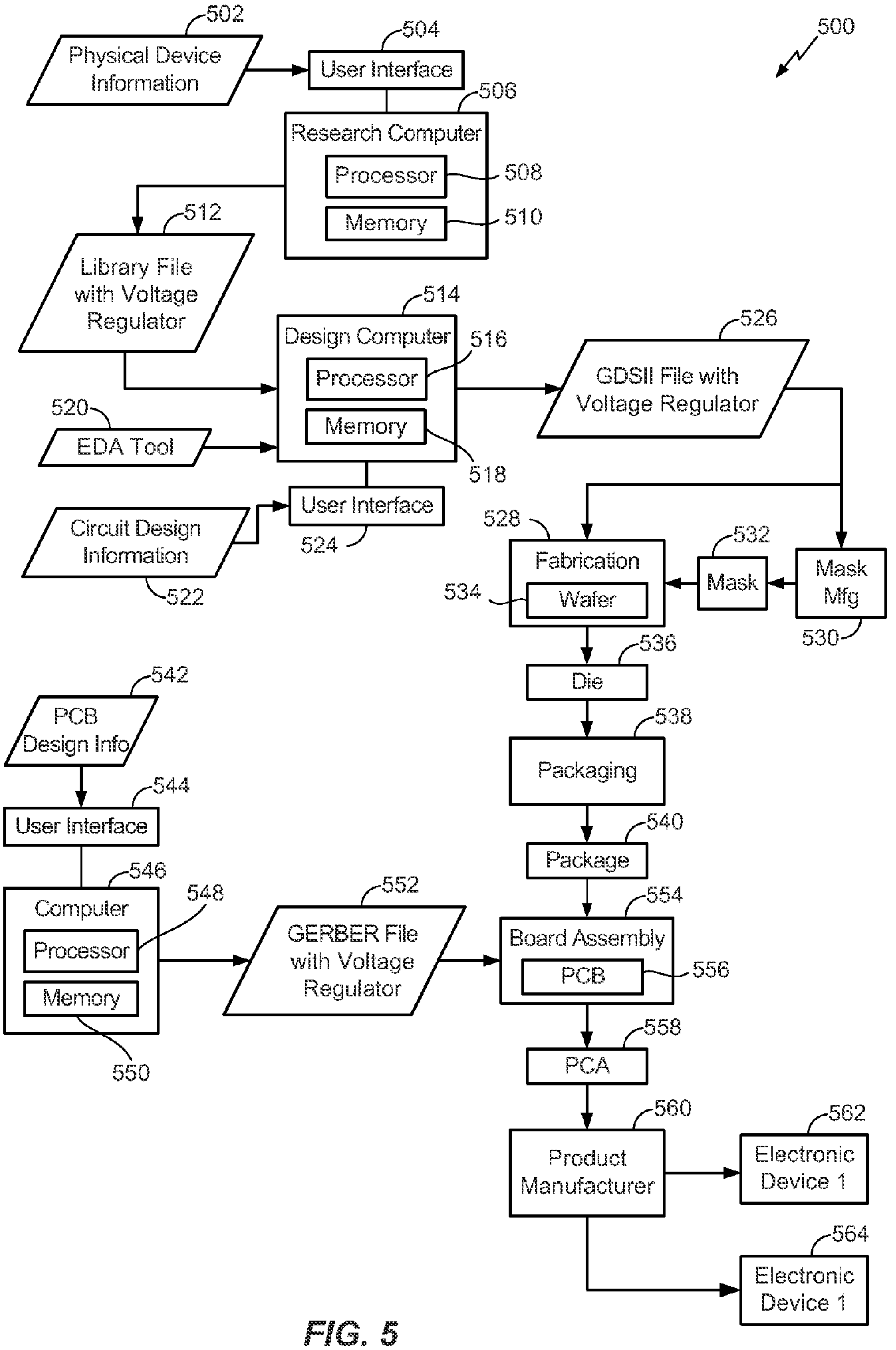
FIG. 5 is a data flow diagram of a particular illustrative embodiment of a manufacturing process to manufacture electronic devices that include a system to compensate frequency in a voltage regulator.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 5 depicts a particular illustrative embodiment of an electronic device manufacturing process 500.

Physical device information 502 is received in the manufacturing process 500, such as at a research computer 506. The physical device information 502 may include design information representing at least one physical property of a semiconductor device, such as the voltage regulator 100 of FIG. 1, the semiconductor die 200 of FIG. 2, the portable device 400 of FIG. 4, or a combination thereof. For example the physical device information 502 may include physical parameters material characteristics, and structure information that is entered via a user interface 504 coupled to the research computer 506. The research computer 506 includes a processor 508, such as one or more processing cores, coupled to a computer readable medium such as a memory 510. The memory 510 may store computer readable instructions that are executable to cause the processor 508 to transform the physical device information 502 to comply with a file format and to generate a library file 512.

In a particular embodiment, the library file 512 includes at least one data file including transformed design information. For example, the library file 512 may include a library of semiconductor devices including the voltage regulator 100 of FIG. 1 or the semiconductor die 200 of FIG. 2, or a combination thereof, that is provided for use with an electronic design automation (EDA) tool 520.

The library file 512 may be used in conjunction with the EDA tool 520 at a design computer 514 including a processor 516, such as one or more processing cores, coupled, to a memory 518. The EDA tool 520 may be stored as processor executable instructions at the memory 518 to enable a user of the design computer 514 to design a circuit using the voltage regulator 100 of FIG. 1 or the semiconductor die 200 of FIG. 2, or a combination thereof, of the library file 512. For example, a user of the design computer 514 may enter circuit design information 522 via a user interface 524 coupled to the design computer 514. The circuit design information 522 may include design information representing at least one physical property of a semiconductor device, such as the voltage regulator 100 of FIG. 1, the semiconductor die 200 of FIG. 2, the portable device 400 of FIG. 4, or a combination thereof. To illustrate, the circuit design information may include identification of particular circuits and relationships to other elements in a circuit design, positioning information, feature size information, interconnection information, or other information representing a physical property of a semiconductor device.

The design computer 514 may be configured to transform the design information, including the circuit design information 522 to comply with a file format. To illustrate, file formation may include a database binary file format representing planar geometric shapes, text labels, and other information about a circuit layout in a hierarchical format, such as a Graphic Data System (GDSII) file format. The design computer 514 may be configured to generate a data file including the transformed design information, such as a GDSII file 526 that includes information describing the voltage regulator 100 of FIG. 1 or the semiconductor die 200 of FIG. 2, or a combination thereof, in addition to other circuits or information. To illustrate, the data file may include information corresponding to a system-on-chip (SOC) that includes at least one of the voltage regulator 100 of FIG. 1 and the semiconductor die 200 of FIG. 2, and that also includes additional electronic circuits and components within the SOC.

The GDSII file 526 may be received at a fabrication process 528 to manufacture the voltage regulator 100 of FIG. 1, the semiconductor die 200 of FIG. 2, the portable device 400 of FIG. 4, or a combination thereof, according to transformed information in the GDSII file 526. For example, a device manufacture process may include providing the GDSII file 526 to a mask manufacturer 530 to create one or more masks, such as masks to be used for photolithography processing, illustrated as a representative mask 532. The mask 532 may be used during the fabrication process to generate one or more wafers 534, which may be tested and separated into dies, such as a representative die 536. The die 536 may be the semiconductor die 200 of FIG. 2 and/or may include a circuit including the voltage regulator 100 of FIG. 1.

The die 536 may be provided to a packaging process 538 where the die 536 is incorporated into a representative package 540. For example, the package 540 may include the single die 536 or multiple dies, such as a system-in-package (SiP) arrangement. The package 540 may be configured to conform to one or more standards or specifications, such as Joint Electron Device Engineering Council (JEDEC) standards.

Information regarding the package 540 may be distributed to various product designers, such as via a component library stored at a computer 546. The computer 546 may include a processor 548, such as one or more processing cores, coupled to a memory 510. A printed circuit board (PCB) tool may be stored as processor executable instructions at the memory 550 to process PCB design information 542 received from a user of the computer 546 via a user interface 544. The PCB design information 542 may include physical positioning information of a packaged semiconductor device on a circuit board, the packaged semiconductor device corresponding to the package 540 including the voltage regulator 100 of FIG. 1, the semiconductor die 200 of FIG. 2, the portable device 400 of FIG. 4, or a combination thereof.

The computer 546 may be configured to transform the PCB design information 542 to generate a data file, such as a GERBER file 552 with data that includes physical positioning information of a packaged semiconductor device on a circuit board, as well as layout of electrical connections such as traces and vias, where the packaged semiconductor device corresponds to the package 540 including the voltage regulator 100 of FIG. 1 or the semiconductor die 200 of FIG. 2, or a combination thereof, in other embodiments, the data file generated by the transformed PCB design information may have a format other than a GERBER format.

The GERBER file 552 may be received at a board assembly process 554 and used to create PCBs, such as a representative PCB 556, manufactured in accordance with the design information stored within the GERBER file 552. For example, the GERBER file 552 may be uploaded to one or more machines for performing various steps of a PCB production process. The PCB 556 may be populated with electronic components including the package 540 to form a represented printed circuit assembly (PCA) 558.

The PCA 558 may be received at a product manufacture process 560 and integrated into one or more electronic devices, such as a first representative electronic device 562 and a second representative electronic device 564. As an illustrative, non-limiting example, the first representative electronic device 562, the second representative electronic device 564, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 562 and 564 may be remote units such as mobile phones, hand-held personal communication systems (PCS) units, portable data units such as personal data assistants, global positioning system (GPS) enabled devices, navigation devices, fixed location data units such as meter reading equipment, or other devices that store or retrieve data or computer instructions, or a combination thereof. Although one or more of FIGS. 1, 2, and 4 may illustrate remote units according to the teachings of the disclosure, the disclosure is not limited to these exemplary illustrated units. Embodiments of the disclosure may be suitably employed in a device that includes active integrated circuitry including memory and on-chip circuitry.

Thus, the voltage regulator 100 of FIG. 1, the semiconductor die 200 of FIG. 2, the portable device 400 of FIG. 4, or a combination thereof, may be fabricated, processed, and incorporated into an electronic device, as described in the illustrative process 500. One or more aspects of the embodiments disclosed with respect to FIGS. 1, 2, and 4 may be included at various processing stages, such as within the library file 512, the GDSII file 526, and the GERBER file 552, as well as stored at the memory 510 of the research computer 506, the memory 518 of the design computer 514, the memory 550 of the computer 546, the memory of one or more other computers or processors (not shown) used at the various stages, such as at the board assembly process 554, and also incorporated into one or more other physical embodiments such as the mask 532, the die 536, the package 540, the PCA 558, other products such as prototype circuits or devices (not shown), or a combination thereof. Although various representative stages of production from a physical device design to a final product are depicted, in other embodiments fewer stages may be used or additional stages may be included. Similarly, the process 500 may be performed by a single entity, or by one or more entities performing various stages of the process 500.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or a other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited, to the embodiments shown herein but is to be accorded, the widest scope possible consistent with the principles and novel features as defined by the following claims.

What is claimed is:

1. A voltage regulator comprising:
an error amplifier;
a voltage buffer responsive to the error amplifier;
a first transistor responsive to the voltage buffer and coupled to a voltage supply source;
a second transistor responsive to the voltage buffer, coupled to the voltage supply source, and further coupled to an output node;
a third transistor coupled to the first transistor; and
a wire having a first end coupled to a gate of the third transistor and a second end coupled to a capacitor,
wherein the capacitor is coupled to a node between the error amplifier and the voltage buffer, and
wherein the capacitor and the third transistor have values that cause a zero value to substantially track variations in an output pole of the output node to maintain stability.

2. The voltage regulator of claim 1, wherein the error amplifier is responsive to a feedback path coupled to the output node.

3. The voltage regulator of claim 1, wherein the third transistor is coupled to a ground node.

4. The voltage regulator of claim 1, wherein the capacitor is a compensation capacitor.

5. The voltage regulator of claim 1, wherein the first transistor and the third transistor form a gain stage.

6. The voltage regulator of claim 5, wherein the gain stage comprises a gain based on a transconductance of the first transistor divided by a transconductance of the third transistor.

7. The voltage regulator of claim 5, wherein the gain stage and the capacitor form a Miller capacitor.

8. The voltage regulator of claim 1, wherein the third transistor has a channel with a large length and a small width.

9. The voltage regulator of claim 1, wherein the output node is coupled to a load.

10. The voltage regulator of claim 9, wherein the second transistor is coupled to the load.

11. The voltage regulator of claim 1, wherein an input voltage is applied to a first input of the error amplifier, and wherein an output voltage is associated with the output node.

12. The voltage regulator of claim 11, wherein the output voltage is fed back to a second input of the error amplifier.

13. The voltage regulator of claim 1, wherein the second transistor is a power transistor.

14. The voltage regulator of claim 1, wherein a loop gain associated with the first transistor and with the third transistor includes the zero value, and wherein a frequency value associated with the zero value changes in response to a larger output current.

15. The voltage regulator of claim 1, wherein the voltage regulator is a low drop-out (LDO) regulator.

16. The voltage regulator of claim 1, wherein an output voltage associated with the output node powers a voltage island, and further comprising a second voltage regulator that powers a second voltage island.

17. The voltage regulator of claim 1, wherein the third transistor comprises a drain and the gate, wherein the drain is coupled to the gate, and wherein the third transistor forms a diode configuration.

18. The voltage regulator of claim 1, wherein a voltage provided by the voltage supply source has a value of less than one volt.

19. The voltage regulator of claim 1, wherein the error amplifier is integrated with a baseband chip.

20. The voltage regulator of claim 1 integrated in at least one semiconductor die.

21. The voltage regulator of claim 1, further comprising at least one of a set top box, a music player, a video player, an entertainment unit, a navigation device, a communications device, a personal digital assistant (PDA), a fixed location data unit, or a computer, into which the error amplifier and the voltage buffer are integrated.

22. The voltage regulator of claim 1, wherein a dominant pole is configured to appear near the node between the error amplifier and the voltage buffer, and wherein the dominant pole cancels out a portion of a pole located between the voltage buffer and the first transistor.

23. The voltage regulator of claim 1, wherein the wire comprises an electrical connector.

24. A method of regulating voltages comprising:
receiving an unregulated voltage at a first transistor and at a second transistor; and
biasing a third transistor based on a bias current from the first transistor,
wherein the first transistor and the second transistor are responsive to an error voltage generated by an error amplifier that is responsive to a reference voltage and to an output node of a voltage regulator via a feedback path,
wherein a capacitor is coupled to the error amplifier and directly coupled to a second end of a wire,
wherein a gate of the third transistor is coupled to a first end of the wire, and
wherein the capacitor and the third transistor have values that cause a zero value to substantially track variations in an output pole of the output node to maintain stability.

25. The method of claim 24, further comprising increasing a transconductance associated with the third transistor in response to an increase in the bias current.

26. The method of claim 24, wherein the capacitor is further coupled to a voltage buffer.

27. The method of claim 24, wherein the zero value substantially tracks the variations in the output pole in response to a change in an output current.

28. The method of claim 24, wherein the second transistor is a thin-oxide transistor.

29. The method of claim 24, wherein receiving the unregulated voltage and biasing the third transistor are performed at a processor integrated into an electronic device.

30. An apparatus comprising:

a semiconductor device comprising:

a first voltage island;

a second voltage island;

a first voltage regulator on the first voltage island configured to power the first voltage island; and a second voltage regulator on the second voltage island configured to power the second voltage island, wherein the first voltage regulator and the second voltage regulator each include:

a first transistor responsive to a voltage buffer and coupled to a voltage supply source, a second transistor responsive to the voltage buffer, coupled to the voltage supply source, and further coupled to an output node, a third transistor coupled to the first transistor, wherein the third transistor has a gate coupled to a first end of a wire, and a capacitor, wherein the capacitor has a value of less than 300 picofarads (pF), wherein the capacitor is coupled to a second end of the wire, wherein the capacitor is coupled to a node between an error amplifier and the voltage buffer, and wherein the value of the capacitor and a transconductance value of the third transistor cause a zero value to substantially track variations in an output pole of the output node to maintain stability.

31. The apparatus of claim 30, wherein the voltage supply source of the first voltage regulator provides a first voltage with a value of less than one volt and the voltage supply source of the second voltage regulator provides a second voltage with a value of less than one volt.

32. The apparatus of claim 30 integrated in at least one semiconductor die.

33. The apparatus of claim 30, further comprising at least one of a set top box, a music player, a video player, an entertainment unit, a navigation device, a communications device, a personal digital assistant (PDA), a fixed location data unit, or a computer, into which the semiconductor device is integrated.

34. An apparatus comprising:

means for amplifying an error;

means for buffering an output of the means for amplifying;

means for providing a bias current in response to an output of the means for buffering;

means for feeding back the bias current to the means for amplifying;

means for providing an output current associated with a position of a pole in response to the output of the means for buffering; and means for adjusting a zero to track the position of the pole, wherein the means for adjusting a zero includes means for storing energy and means for adjusting a gain, wherein the means for storing energy is coupled to a second end of a wire, wherein a gate of the means for adjusting the gain is coupled to a first end of the wire, wherein the means for adjusting the gain is coupled to the means for providing the bias current, and wherein the means for storing energy and the means for adjusting a gain have values that cause a zero value to substantially track variations in the pole to maintain stability.

35. The apparatus of claim 34 integrated in at least one semiconductor die.

36. The apparatus of claim 34, further comprising at least one of a set top box, a music player, a video player, an entertainment unit, a navigation device, a communications device, a personal digital assistant (PDA), a fixed location data unit, or a computer, into which the means for adjusting the zero is integrated.

37. A method of regulating voltage, the method comprising:

a step for receiving an unregulated voltage at a first transistor and at a second transistor; and a step for biasing a third transistor based on a bias current from the first transistor, wherein the first transistor and the second transistor are responsive to an error voltage generated by an error amplifier that is responsive to a reference voltage and to an output node of a voltage regulator via a feedback path, wherein a capacitor is coupled to the error amplifier and coupled to a second end of a wire, wherein a gate of the third transistor is coupled to a first end of the wire, and wherein the capacitor and the third transistor have values that cause a zero value to substantially track variations in an output pole of the output node to maintain stability.

38. The method of claim 37, wherein the step for receiving the unregulated voltage and the step for biasing the third transistor are performed at a processor integrated into an electronic device.

39. A method comprising:

receiving, at a processor, design information representing at least one physical property of a semiconductor device, the semiconductor device comprising:

an error amplifier;

a voltage buffer responsive to the error amplifier;

a first transistor responsive to the voltage buffer and coupled to a voltage supply source;

a second transistor responsive to the voltage buffer, coupled to the voltage supply source, and further coupled to an output node;

a third transistor coupled to the first transistor; and a wire having a first end coupled to a gate of the third transistor and a second end coupled to a capacitor, wherein the capacitor is coupled to a node between the error amplifier and the voltage buffer, and wherein the capacitor and the third transistor have values that cause a zero value to substantially track variations in an output pole of the output node to maintain stability;

transforming, at the processor, the design information to comply with a file format; and generating, at the processor, a data file including the transformed design information.

40. The method of claim 39, wherein the data file includes a GDSII format.

41. The method of claim 39, wherein the data file includes a GERBER format.

* * * * *